US012226873B2

(12) United States Patent
Istratov et al.

(10) Patent No.: US 12,226,873 B2
(45) Date of Patent: Feb. 18, 2025

(54) SYSTEM AND METHOD FOR PROCESSING SILICON WAFERS

(71) Applicant: Siltronic Corporation, Portland, OR (US)

(72) Inventors: Andrei Istratov, Portland, OR (US); Tom Wu, Vancouver, WA (US); Katharina Zahnweh, Burghausen (DE)

(73) Assignee: SILTRONIC CORPORATION, Portland, OR (US)

( * ) Notice: Subject to any disclaimer, the term of this patent is extended or adjusted under 35 U.S.C. 154(b) by 436 days.

(21) Appl. No.: 17/724,503

(22) Filed: Apr. 20, 2022

(65) Prior Publication Data

US 2023/0339069 A1    Oct. 26, 2023

(51) Int. Cl.
*B24B 49/02*  (2006.01)
*B24B 9/06*   (2006.01)
*B28D 5/00*   (2006.01)

(52) U.S. Cl.
CPC .............. *B24B 49/02* (2013.01); *B24B 9/065* (2013.01); *B28D 5/0064* (2013.01)

(58) Field of Classification Search
CPC ......... B24B 49/02; B24B 9/065; G01B 21/30; G01B 2210/56
See application file for complete search history.

(56) References Cited

U.S. PATENT DOCUMENTS

| 5,291,415 | A | | 3/1994 | Zarowin et al. |
| 6,057,170 | A | * | 5/2000 | Witte ................... G01B 21/30 438/15 |

(Continued)

FOREIGN PATENT DOCUMENTS

| TW | 202010995 A | 3/2020 |
| WO | WO 03077309 A2 | 9/2003 |

(Continued)

OTHER PUBLICATIONS

A. Nutsch, et al., Determination of Flatness on Patterned Wafer Surfaces Using Wave-front Sensing Methods, Ninth International Symposium on Laser Metrology, Sep. 2008, pp. 1-12, vol. 7155, Fraunhofer IISB, Germany, Imaging Optic, France.

(Continued)

*Primary Examiner* — Binh X Tran
(74) *Attorney, Agent, or Firm* — LEYDIG, VOIT & MAYER, LTD.

(57) ABSTRACT

A method for processing a silicon wafer, the method including cutting an ingot to form a wafer, extracting from measured shape data a cross-sectional profile, the cross-sectional profile passing through the center of the wafer and being aligned with a cutting direction of an ingot, interpolating the shape data with a fixed and pre-determined step size, fitting a first second-degree polynomial to the cross-sectional profile, determining a residual profile by subtracting the polynomial from the cross-sectional profile, fitting a second second-degree polynomial to the residual profile using a sliding window of pre-determined width to determine a position, height, and curvature of each peak and valley of the residual profile, determining a waviness parameter based on the position, height, and curvature of each peak and valley of the residual profile, and further processing the wafer based on the waviness parameter and a predetermined waviness threshold.

19 Claims, 3 Drawing Sheets

(56) References Cited

U.S. PATENT DOCUMENTS

| | | | |
|---|---|---|---|
| 6,613,591 B1* | 9/2003 | Bhagavat | B24B 37/005 |
| | | | 438/460 |
| 11,348,844 B2* | 5/2022 | Takei | H01L 22/20 |
| 2012/0178346 A1 | 7/2012 | Wiesner et al. | |
| 2013/0333682 A1* | 12/2013 | Blank | B28D 5/0082 |
| | | | 125/16.02 |
| 2014/0117380 A1* | 5/2014 | Loboda | B24B 7/228 |
| | | | 438/692 |
| 2019/0333775 A1* | 10/2019 | Nishitani | B24B 37/013 |
| 2021/0150116 A1 | 5/2021 | Fan et al. | |
| 2024/0128130 A1* | 4/2024 | Suzuki | G01N 21/47 |

FOREIGN PATENT DOCUMENTS

| | | |
|---|---|---|
| WO | WO 2006018961 A1 | 2/2006 |
| WO | WO 2021084939 A1 | 5/2021 |

OTHER PUBLICATIONS

Van Wingerden et al., Optical profiler for low-reflectance ultrasmooth Surfaces, Optical Engineering, Nov. 1992, pp. 2450-2457, vol. 31, No. 11, Bellingham, WA, US.

* cited by examiner

SYSTEM AND METHOD FOR PROCESSING SILICON WAFERS

FIELD

The present invention relates to systems and methods for processing semiconductor wafers.

BACKGROUND

Semiconductor wafers are commonly used in a variety of applications, including in the fabrication of circuits and solar cells. Due to the ubiquitous use of integrated circuits in electrical and electromechanical devices, production of high quality semiconductor wafers is increasingly important for optimum product quality and performance. This is especially true when constraints in the semiconductor industry, such as supply chain constraints, material shortages, high demand, and other local or global economic forces, require semiconductors to be manufactured as efficiently with minimal margin for error.

The role of wafer geometry in wafer chucking was studied by K. Turner et al. [K. T. Turner, R. Ramkhalawon, J. K. Sinha, "Role of wafer geometry in wafer chucking", Journal of Micro/Nanolithography, MEMS, and MOEMS, 12(2), 023007 (2013)]. They simulated wafer shape with sinusoidal curves with a variety of spatial frequencies and amplitudes and used finite element analysis to calculate the maximum amplitude of waves that can be fully flattened with a standard clamping pressure. They repeated calculations for different spatial wavelengths of the waves. They found an almost linear correlation between threshold wavelength and threshold amplitude on the log-log scale. Specifically, waves with a longer wavelength can be flattened on a chuck when their amplitude is relatively high, whereas waves with short wavelength can only be flattened when waves amplitude is very small. For example, according to their calculations, waves with spatial wavelength of 100 mm could be flattened with amplitude up to about 2 mm; for waves with wavelength of 10 mm, the threshold amplitude of the wafers was calculated as 0.2 microns; and with wavelength of 1 mm, the threshold was found to be just about 0.5 nm.

In reality, shape features are not sinusoidal and can have any shape. Therefore, sharpness of the peaks, or curvature of their shape near the apex of the peak or valley, is more appropriate to characterize their impact on device yields.

Wafers have irregularities in shape due to inherent imperfections in wafer manufacturing processes, and wafer shape is one of the key parameters of silicon wafers. Wafer shape is defined as geometry variation of the medial plane of the wafer in a free state ["SEMI M49-0312 Guide for specifying geometry measurement systems for silicon wafers for the 130 nm to 22 nm technology generations," (2012); Semiconductor Equipment and Materials International; http://www.semi.org]. Wafer shape may have impact on yields in a device fabrication line. One type of wafer irregularity, referred to as waviness, is a measure of variations in thickness of a wafer or variations in the wafer surface's height. Waviness represents irregularities in the wafer's shape with spatial frequencies which fall between local geometry and bowing/warping. Wavy shape features are formed during sawing of silicon ingots and survive through grinding and/or polishing.

Technical issues caused by a wavy wafer shape may be difficult to troubleshoot if a metric for waviness is not available. Wafer shape can be a critical parameter for process steps which require the wafer be flattened by a vacuum, electrostatic chuck, or a semi-flexible chuck. Process steps in device manufacturing which use wafer chucking, and thus may be affected by waviness, include photolithography and chemical-mechanical planarization/polishing (CMP). Wafer bonding, arguably, could also see impact from waviness of the wafer.

A silicon wafer may, within a limited range, plastically deform and adhere to the shape of the chuck under the clamping pressure. In case of photolithography, if shape deviations do not lend themselves to flattening under clamping pressure, some parts of the exposed area may be out of focus, or a lithography scanner may have difficulties exposing a die correctly.

In addition to photo lithography, a known potential area of failures related to waviness is CMP. CMP is a touch-polishing process which can be utilized to remove the layer of oxide deposited on top of the nitride layer. A possible mechanism of failure at CMP caused by waviness was discussed by K. Turner ["Role of process-induced wafer geometry changes in advanced semiconductor manufacturing", presentation on Jul. 9, 2014 at Semicon West 2014 conference, San Francisco, CA, 2014]. If a wafer has a significant waviness, either oxide will not be completely removed in wafer valleys, or nitride will be over-polished at the wafer's high spots. In addition, depth of shallow trench isolation wells can become variable. Wafer waviness can lead to a variable nitride thickness after CMP and a variable Shallow Trench Isolation (STI) depth. The failure risk is exacerbated by the fact that CMP typically uses a semi-flexible chuck which exerts downward pressure on the wafer against a polishing pad. Such chucks have only limited ability to flatten a wafer.

Conventional parameters used to characterize attributes of waviness include wafer surface height, bow and warp. Wafer surface height represents the thickness of a wafer at a particular location within the wafer. Bow is a parameter representing the height difference of the median surface at a center of a wafer compared to the height of a plane intersecting three median surface points about the edge of the wafer. Warp is similar to bow, but instead compares the median surface of the entire wafer rather than only at the center of the wafer. Present techniques also utilize thickness measurements to provide a curvature profile of the wafer by taking the second derivative of a data curve representing thickness measurements along a radius of the wafer.

There are previous attempts to detect and quantify waviness reported in the patent literature. For example, international patent publication no. WO 2003/077309 A2 describes using a band-pass Gaussian filter in frequency domain to eliminate features of the surface profile with too short or too long spatial frequencies and calculates "warp" of the filtered surface (distance between the highest peak and the deepest valley, measured relatively to a best fit plane). This filtered warp metric is used as a characteristic for waviness.

Patent WO 2021/084939 calculates a first or second derivative of the wafer shape and characterizes waviness as a maximum differential value within pre-defined areas of the wafer (cut-in area, center of the wafer, and cut-out area). Separate limits for the derivative of the shape can be set for these three areas for grading the wafers.

The first of the two patents are sensitive to the height of the waviness features, but not sensitive to the "sharpness", or "curvature" of the peaks and valleys at their apexes. The second patent is sensitive to the "sharpness" of the features, but does not take into account their amplitude. Thus, improved systems and methods for addressing these deficiencies are needed in the art.

SUMMARY

In an embodiment, the present disclosure provides a method for processing silicon wafers, the method comprising cutting an ingot to form a wafer, extracting from measured shape data a cross-sectional profile, the cross-sectional profile passing through the center of the wafer and being aligned with a cutting direction of an ingot, interpolating the shape data with a fixed and pre-determined step size, fitting a first second-degree polynomial to the cross-sectional profile, determining a residual profile by subtracting the polynomial from the cross-sectional profile, fitting a second second-degree polynomial to the residual profile using a sliding window of pre-determined width to determine a position, height, and curvature of each peak and valley of the residual profile, determining a waviness parameter based on the position, height, and curvature of each peak and valley of the residual profile, and further processing the wafer based on a comparison of the waviness parameter to a predetermined waviness threshold.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
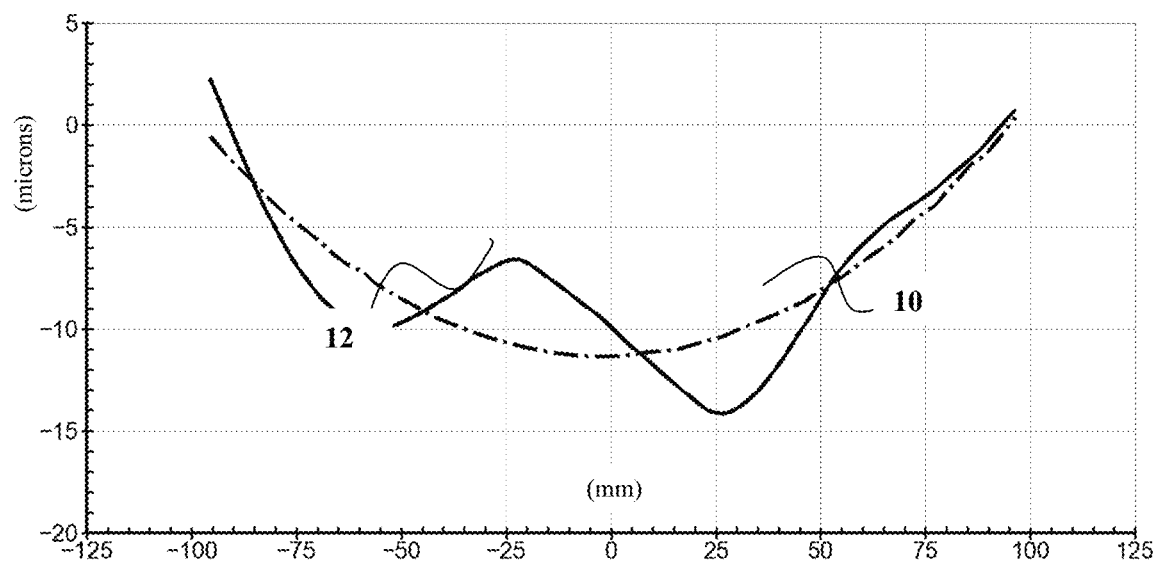
FIG. 1 depicts a graphical representation of a wafer profile and a corresponding fit according to an embodiment of the invention.

Embodiments of the present invention provide different methods of processing wafers based on data processing from those known in the prior art. In some embodiments, first, parabolic fit to the linear cross-sectional profile of the wafer is determined to eliminate the bowl-like shape caused by strain from the wafer's backside layer. Then, parabolic fit within a moving window is used to identify and quantify peaks and valleys.

Embodiments of the present invention provide important advantages over prior art systems and methods. For example, disclosed embodiments provide waviness measurements which are sensitive to both height and sharpness of a wafer. Disclosed embodiments combine contributions from all features on the wafer in a single dimensionless parameter.

Metrology tools manufacturers have recognized that there is a correlation between a typical amplitude of shape features on the wafers and their spatial wavelength. A whole range of wafer geometry metrics has been developed. For example, bow and warp metrics are sensitive to shape features with wavelengths similar to the radius of the wafer. Bow and warp metrics have relatively high amplitude, from several microns to tens and even over hundred microns, and have relatively large spatial wavelengths approximately in the range of tens to hundreds of centimeters. Local geometry metrics (e.g., site flatness quality requirements (SFQR)) characterize features with the size on the scale of several centimeters, but amplitude of those features is much less than the amplitude of bow and warp features and can be as low as a few microns. Nanotopography (NT) characterizes even shorter spatial wavelengths (around 1-2 cm in size or less) with even smaller amplitudes. Finally, even finer features are captured by the roughness metric which starts from millimeter size features with very small amplitude and goes down into the microns range. Due to the way how local geometry, NT, and roughness are computed, they, strictly speaking, are flatness metrics rather than shape metrics. Yet, in theory, one can apply NT and local geometry metrics to wafer shape data.

The area in the middle of the range of spatial wavelengths, around roughly 3 to 10 cm (but it can extend to 2 to 20 cm), is what is characterized as "waviness" throughout the present disclosure, and is not covered by the commercially available metrology tools. The warp metric can detect oscillations in shape in the "waviness" spatial frequency range. However, as amplitude of waviness features is typically lower than amplitude of warp features, rejection limits appropriate for bow and warp will be too high for waviness and cannot be used to reject non-compliant wafers. Bow and warp metrics do not have the ability to distinguish shape features based on their spatial wavelength.

Embodiments of the present invention develop a metrology to characterize and quantify waviness in wafer shape. Specifically, the metrology for characterization of waviness includes dimensionless parameters which take into account both amplitude of peaks and valleys, and sharpness of valley shapes. Waviness, and the parameters used to quantify waviness, can be used for screening wafers for defects and/or quality control.

Since when cutting wire wanders sideways, it wanders across the whole ingot that is being cut, waves are also expected to go across the whole wafer. Wafer waviness is often caused by multi-wire wafer sawing, a process in which ingot segments are cut into individual wafers by thin wires. Specifically, wafer height variations are typically introduced in an oscillating manner orthogonal to the extent of the cutting wires. The lateral movement or wandering of the wires as they proceed through an ingot causes these wave-like variations in cutting position. Because a cutting wire tends to wander sideways, wires cutting ingots tend to wander along the entire ingot that is being cut, thus producing wave-like variations that extend across the whole wafer. The amplitude of wavy features is measured in microns and is not visible to the human eye. Waves of such small amplitude create only very weak signal in bow and warp metrics. This signal is usually very small compared to typical bow and warp rejection limits and cannot be used to identify and screen out such wafers.

Waviness, as defined in the present disclosure, can be characterized mathematically as the sum of absolute values of products of heights and curvatures of all peaks and valleys detected in a wafer. Specifically, waviness can be characterized by the following formula in which WavPar is a waviness parameter, Height is an ith height measurement at a location of the wafer, and Curvature is an ith curvature measurement at the same location of the wafer:

$$WavPar = 1000 \times \Sigma_i |Height_i \times Curvature_i|$$

The waviness parameter is dimensionless. A larger number of waves in the wafer, a higher amplitude of waves, or sharper, and narrower peaks and valleys all lead to a higher value of the waviness parameter. The coefficient of 1000 was introduced to bring WavPar values into an easy-to-read range, typically over 1.

Therefore, in some embodiments of the present invention, it is sufficient to analyze wafer shape along a linear scan that crosses through the wafer center along the cutting direction of the ingot.

The starting point of the assessment of waviness is to extract a linear scan along the cutting direction from the shape measurement. Some embodiments described in the present disclosure use data measured on 200 mm tools, although the same method can be equally applied to measurements done on tools using 300 mm technology. Both sizes of tools are designed to measure geometry of the wafer using either capacitive or optical methods. Both tools can calculate dimensions of a wafer's surface shape. The cutting direction during wire-cutting of the wafer can be determined relative to a notch in the wafer. The cutting direction is determined for each production lot from data recorded in a production database when a particular ingot segment was mounted for slicing.

The spatial resolution of a wafer scan may be determined by a scanner's measurement mode. To reduce complexity of data processing and make it independent of the scanner's measurement mode, data is interpolated in a linear scan to a predefined step size which can be any number. In one embodiment, it is a 1 mm step.

Silicon wafers, especially in 200 mm technology, oftentimes have a bowl-like shape. This shape is created primarily by stress from backside polysilicon and low temperature oxide (LTO) layers, but can also be impacted by stress from the epitaxial layer. In some embodiments of the present invention, the bowl-like shape of wafer reduced or eliminated in order to improve detection of peaks and valleys related to waviness. This is accomplished by fitting the shape profile of the wafer with a second order polynomial, such as a parabola. The parabolic fit is then subtracted from the raw linear shape profile ("shape curve"), leaving behind what are referred to herein as "residuals".

FIG. 1 depicts a profile 10 of a wafer and a corresponding parabolic fit 12. The profile 10 is understood to be exemplary only, as all wafers will have individually determinable profiles that may vary and have differing profiles, and therefore different corresponding parabolic fits. The profile 10 represents a profile of a surface of a wafer measured in a cutting direction in which the wafer was cut from an ingot. In the exemplary profile 10 depicted in FIG. 1, the profile 10 has a very pronounced wavy feature caused by multi-wire sawing, as shown by the oscillating profile 10 in the vertical axis. The parabolic fit 12 is a second degree polynomial calculated based on the individual data points that make up the profile 10.

Figure 2:
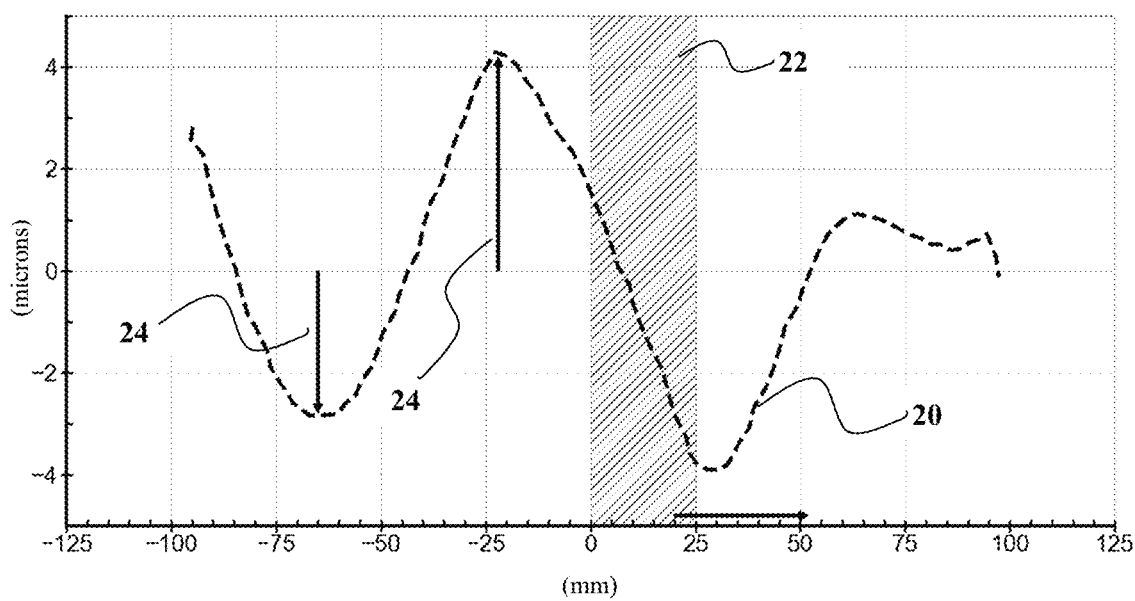
FIG. 2 depicts a graphical representation of a residual profile according to an embodiment of the invention.

FIG. 2 depicts a residual 20, which represents data points correlating to the difference between the profile 10 of the exemplary wafer of FIG. 1 and the parabolic fit 12. Specifically, the residual 20 is calculated by subtracting the parabolic fit 12 from the profile 10.

Subsequent steps in assessing waviness require identifying peaks and valleys of the residual 20. This may be accomplished by a variety of mathematical methods. In some embodiments, it is accomplished by running a sliding window 22 from one end of the residual to the other end of the residual and fitting the residuals curve within the window with a second degree polynomial according to the following formula:

$y = ax^2 + bx + c$

Coefficient a of this parabolic equation is the measure of curvature of the peak. Both the amplitude of the peak and its position/height can also be easily determined from this formula:

Peak position, P:

$$P = -\frac{b}{2a}$$

and peak/valley height, H:

$H = aP^2 + bP + c$

FIG. 2 provides an illustration of a sliding window 22 that is exemplary only and captures only a window that has already progressed from the leftmost part of residuals 20 to the center of residuals 20. A parabolic fit is done using data points within this sliding window 22.

The window should be sufficiently narrow to enable the algorithm to separate individual peaks and valleys and achieve a good quality of fit. A variety of window widths may provide adequate results. In some embodiments, the width of the sliding window 22 is set to 20 mm. The criterion for selection of the width of sliding window 22 is based on the ability of an algorithm to separate wafers with a significant waviness from wafers with low waviness.

The sliding window 22 moves or "slides" one data point at a time along residual 20. For example, if interpolation was done with a step size of 1 mm, the sliding window 22 moves 1 mm at a time. Peaks and valleys of the residual may be identified by a software algorithm based on detection of the peaks and valleys in multiple adjacent positions of the sliding window 22 as it moves. In some embodiments, the software algorithm separates peaks and valleys with amplitude over a predetermined threshold to help eliminate noise. In some embodiments, the curvatures and amplitudes for each peak are averaged by the software algorithm.

Once peaks and valleys are identified by the software algorithm, the respective height 24 of each peak and valley relative to the horizontal axis is determined. Because the horizontal axis corresponds to a wafer having perfect flatness with no variation in height, the respective height 24 of each peak and valley corresponds to wafer shape defects which, if removed, would create a flat wafer. Using the height 24 and curvature a of the peak at its apex, the Waviness Parameter formula is used to calculate a total contribution of all peaks and valleys to the Waviness Parameter. For example, the wafer represented by the residual 20 of FIG. 2 would have approximately two peaks and two valleys, resulting in a WavPar that is the sum of four components. It will be readily understood that wafers of varying shape will have variable numbers of peaks and valleys in varying patterns. In each circumstance, the formulas and methods described above result in a WavPar value that is the sum of identified peaks and valleys representing height variations in the wafer, thus providing advantageous insight into the shape of the wafer over traditional wafer metrics.

In some embodiments, the waviness analysis calculates a linear shape profile from a two-dimensional shape map of the wafer. Such embodiments enable exclusion of data points within a certain radius from the center of the wafer (approximately 40 to 45 mm, but up to the radius of the wafer). This method may be particularly useful, for example, in 200 mm technology, where older generation metrology tools are equipped with a small diameter chuck to hold the wafer during measurement. The wafer is initially chucked in the center, scanned using capacitance probes from the wafer edge to the edge of the chuck. Then the wafer is re-chucked closer to the edge, and the center area is scanned. Wafer chucking, even on a small chuck, leads to some degree of deformation of a wafer's shape, as the wafer is partly flattened in the chuck area. Older generation tool software attempts to stitch wafer maps collected with the two chucking locations. Since wafer shape was distorted by chucking in the two chucking locations, there is no perfect overlap between these two maps. The process of stitching the maps may create artifacts in the wafer shape, for example because a circular area in the chuck area does not smoothly follow the area outside of the chuck, and can, in rare cases, even lead to false peaks in wafer waviness profiles. Removal of data points from the center of the wafer, from a circle in the middle with radius equal or greater than the chuck size, enables determination of a cleaner linear "shape profile" without such artifacts.

In some embodiments, a first step to obtaining a cleaner linear shape profile described above is to fit the three-dimensional shape of the wafer with a paraboloid (a three-dimensional surface obtained by a rotating parabola). The formula for a symmetric paraboloid is $$a(x^2+y^2)+bz+c=0$$

or, in the more general case of a hyperbolic paraboloid (which can form a shape similar to shape of a potato chip), $$ax^2+by^2+cz+d=0$$

This fit enables removal of shape variations of the wafer, for example bowl-like or potato-chip-like shapes of the wafer. Subtraction of the fitted paraboloid from measured wafer shape yields two-dimensional residuals.

Figure 3:
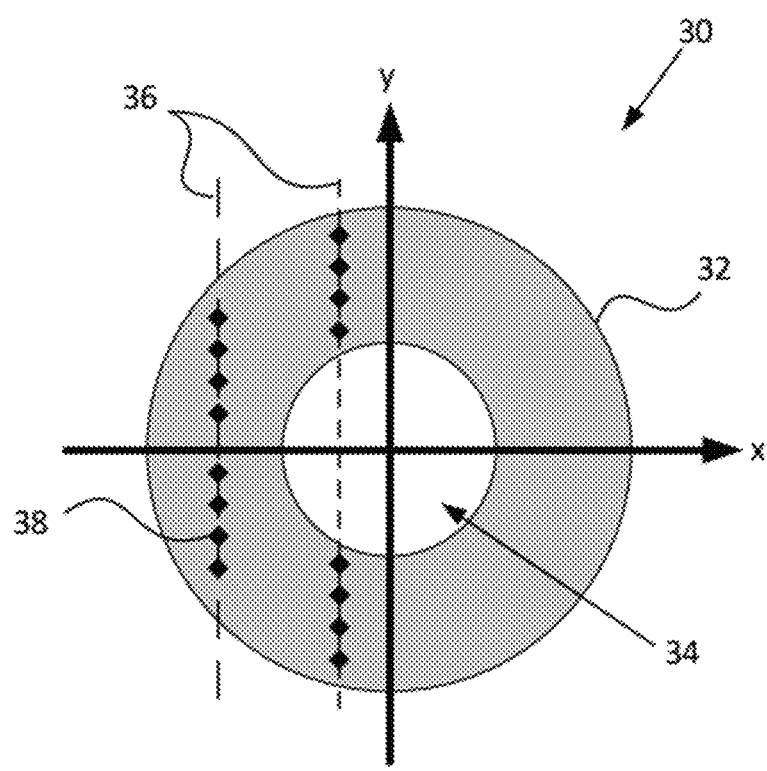
FIG. 3 depicts a two-dimensional map of a wafer according to an embodiment of the invention.

A second step is to exclude data points within a pre-defined radius in the center of the wafer. This enables exclusion of areas with potential artifacts in measured data. FIG. 3 shows an exemplary two-dimensional map 30 of a wafer profile 32 having a center area 34. Linear shape profiles are calculated by averaging data points 38 along vertical lines 36 within the wafer profile 32 for each x-axis value rounded to a predefined step size. The vertical lines 36 and corresponding data points 38 provide a schematic visualization of data point averaging to eliminate artifacts in or near the wafer center area 34. The x-axis represents the cutting direction during wafer cutting and the y-axis represents a direction of extent of cutting wires.

Once a linear shape profile is calculated, the subsequent evaluation of peaks and valleys may follow using the steps and algorithms previously described.

An analysis of waviness at the end of a wafering process can be used to reject wafers with waviness which exceeds a pre-defined rejection limit determined based on customer needs and sensitivity. Measurements of waviness after multi-wire slicing enables one to implement wafer screening after multi-wire sawing in order to reject wafers which are unlikely to pass end of line inspection early in the process. Additionally, post-multi-wire sawing waviness data can be utilized to monitor performance of the multi-wire saws and make adjustments to sawing process as needed. Post-cutting processes, such as grinding, polishing, and/or epitaxy can also be conducted based on waviness parameter determinations. For example, post-cutting processes may only be implemented for wafers that do not comport within a pre-determined threshold of acceptable waviness. In other examples, the degree number of post-processing techniques and/or the degree of post-processing techniques may also be determined based on the determined waviness parameter. In each instance, the waviness parameter determination may thus enhance both quality control processes and the quality of an individual wafer itself.

In some embodiments, the waviness parameter of one wafer can be used to predict the waviness of other wafers, thereby enabling efficient quality control decisions regarding production lots. For example, a determined waviness parameter can be used to predict the waviness of other wafers that would be produced by the same ingot and/or set of multi-wires used in the cutting process. Then, depending on the predicted waviness parameter, the wafers may need to be sorted and or post-processed in different manners depending on the predicted waviness parameter. In this manner, predicted waviness parameters that are within quality control limits can allow for efficient production of wafers without time- and resource-consuming measurements processes for independently determining the waviness of each wafer.

In some embodiments, the waviness parameter enables feedback for performance for multi-wire saws and/or other equipment. For example, a baseline waviness parameter may be established by statistical means (e.g. an average or median of historical waviness parameters). Then, the waviness parameter associated with a particular set of multi-wires may be compared to the baseline waviness parameter. Such a comparison would enable quick determination of whether the multi-wires (or other equipment) are operating within acceptable tolerances. Equipment maintenance decisions can then be made based on the comparison of a waviness parameter to the baseline waviness parameter.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for processing a silicon wafer, the method comprising:
   cutting an ingot to form a wafer;

extracting from measured shape data a cross-sectional profile, the cross-sectional profile passing through the center of the wafer and being aligned with a cutting direction of the ingot;

interpolating the measured shape data with a fixed and pre-determined step size;

fitting a first second-degree polynomial to the cross-sectional profile;

determining a residual profile by subtracting the first second-degree polynomial from the cross-sectional profile;

fitting a second second-degree polynomial to the residual profile using a sliding window of pre-determined width to determine a position, height, and curvature of each peak and valley of the residual profile;

determining a waviness parameter based on the position, height, and curvature of each peak and valley of the residual profile; and further processing the wafer based on a comparison of the waviness parameter to a predetermined waviness threshold.

2. The method of claim 1, wherein the waviness parameter is determined based on the following formula in which WavPar is the waviness parameter, $Height_i$ is the height of an ith peak or valley, and $Curvature_i$ is the curvature of an ith peak or valley:

$$WavPar = 1000 \times \sum_i |Height_i \times Curvature_i|.$$

3. The method of claim 1, wherein the predetermined waviness threshold is a rejection limit and the further processing the wafer comprises rejecting the wafer if the waviness parameter exceeds the rejection limit.

4. The method of claim 1, wherein the further processing the wafer comprises polishing or grinding the wafer.

5. The method of claim 1, further comprising determining a degree of further processing that is required to reduce a wafer waviness to within the predetermined waviness threshold.

6. The method of claim 1, further comprising determining a predicted wafer waviness parameter of a yet uncut wafer based on the determined waviness parameter.

7. The method of claim 6, further comprising comparing the predicted wafer waviness parameter to the determined waviness parameter to determine whether wafer sorting should occur.

8. The method of claim 1, further comprising:
determining a baseline waviness parameter;
comparing the waviness parameter to the baseline waviness parameter to determine whether a multi-wire saw requires maintenance; and
performing maintenance on the multi-wire saw based on the comparison of the waviness parameter to the baseline waviness parameter.

9. The method of claim 8, wherein the baseline waviness parameter is statistically determined from historically determined waviness parameters.

10. A method for processing a silicon wafers, the method comprising:
cutting an ingot to form a wafer;
extracting a two-dimensional shape profile from measured wafer data;
fitting a paraboloid to the two-dimensional shape profile to approximate a shape of the wafer;
calculating two-dimensional residuals by subtracting the paraboloid from the two-dimensional shape profile;
calculating a linear shape profile along a cutting direction of the wafer by averaging data points corresponding to incremental horizontal axis values, rounded to pre-defined increments, wherein the horizontal axis values correspond to the cutting direction;
fitting a second degree polynomial to a residual profile using a sliding window of pre-determined width to determine a position, height, and curvature of each peak and valley of the residual profile;
determining a waviness parameter based on the position, height, and curvature of each peak and valley of the residual profile; and
further processing the wafer based on a comparison of the waviness parameter to a predetermined waviness threshold.

11. The method of claim 10, wherein the waviness parameter is determined based on the following formula in which WavPar is the waviness parameter, $Height_i$ is the height of an ith peak or valley, and $Curvature_i$ is the curvature of an ith peak or valley:

$$WavPar = 1000 \times \sum_i |Height_i \times Curvature_i|.$$

12. The method of claim 10, wherein the predetermined waviness threshold is a rejection limit and the further processing the wafer comprises rejecting the wafer if the waviness parameter exceeds the rejection limit.

13. The method of claim 10, wherein the further processing the wafer comprises grinding or polishing the wafer.

14. The method of claim 10, further comprising excluding a center area of the wafer from the two-dimensional shape profile.

15. The method of claim 14, wherein the center area corresponds to a wafer chuck area of a wafer measuring tool.

16. The method of claim 10, further comprising determining a predicted wafer waviness parameter of a yet uncut wafer based on the determined waviness parameter.

17. The method of claim 16, further comprising comparing the predicted wafer waviness parameter to the determined waviness parameter to determine whether wafer sorting should occur.

18. The method of claim 10, further comprising:
determining a baseline waviness parameter;
comparing the waviness parameter to the baseline waviness parameter to determine whether a multi-wire saw requires maintenance; and
performing maintenance on the multi-wire saw based on the comparison of the waviness parameter to the baseline waviness parameter.

19. The method of claim 18, wherein the baseline waviness parameter is statistically determined from historically determined waviness parameters.

* * * * *